United States Patent
Underwood et al.

(10) Patent No.: US 8,159,518 B2
(45) Date of Patent: Apr. 17, 2012

(54) VIDEO STREAMING SYSTEM

(75) Inventors: Rosa M. Underwood, Washington, DC (US); Jimmie D. Peterman, Glenndale, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1425 days.

(21) Appl. No.: 11/690,333

(22) Filed: Mar. 23, 2007

(65) Prior Publication Data

US 2008/0231684 A1 Sep. 25, 2008

(51) Int. Cl.
*H04N 7/14* (2006.01)
(52) U.S. Cl. ............... 348/14.01; 348/14.02; 348/14.12
(58) Field of Classification Search .... 348/14.01–14.16; 709/204–205
See application file for complete search history.

(56) References Cited

U.S. PATENT DOCUMENTS

| | | | | |
|---|---|---|---|---|
| 5,274,762 | A * | 12/1993 | Peterson et al. | 709/219 |
| 2006/0029050 | A1* | 2/2006 | Harris et al. | 370/356 |
| 2006/0103626 | A1* | 5/2006 | Tsuda | 345/156 |
| 2007/0139513 | A1* | 6/2007 | Fang | 348/14.01 |
| 2007/0139514 | A1* | 6/2007 | Marley | 348/14.01 |
| 2007/0173293 | A1* | 7/2007 | Tran | 455/569.1 |
| 2008/0134235 | A1* | 6/2008 | Kalaboukis | 725/32 |
| 2008/0158333 | A1* | 7/2008 | Krisbergh et al. | 348/14.01 |

* cited by examiner

*Primary Examiner* — Melur Ramakrishnaiah

(57) ABSTRACT

A streaming video system may include a video capture terminal configured to communicate with a first communications network and a video receiving terminal configured to communicate with a second network operatively connected to the first network. The video capture terminal may be configured to capture video data and stream the video data to the receiving terminal via the first network and the second network in substantially real-time.

23 Claims, 8 Drawing Sheets

VIDEO STREAMING SYSTEM

BACKGROUND INFORMATION

Portable video recording devices, such as analog video recording devices and digital recording devices, exist in a variety of forms. Exemplary devices include standalone video cameras or camcorders, digital still cameras including video or "movie" modes, and mobile telephones having cameras integrated therein. These devices may include a variety of recording mediums, such as magnetic tape, optical discs, solid-state storage media, such as flash memory, and hard drives. Video recorded on these devices must typically be either physically removed from the device or otherwise transmitted to another device upon completion of recording prior to being viewable by an audience remote from the device.

In one example, a digitally recorded video may be recorded onto the video recording device and subsequently imported into a personal computer. The imported video may then be emailed to the end-user or potentially uploaded to a web site for subsequent viewing.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention. Instead, the scope of the invention is defined by the appended claims and their equivalents.

Implementations described herein may allow for substantially real-time transmission of video data from a video capture device to one or more addressable receiving devices via one or more networks, such as cellular-based and/or packet switching data networks. The received video stream may be viewed in substantially real time on a display associated with the receiving device. Alternatively, the received video stream may be stored for later viewing.

Figure 1:
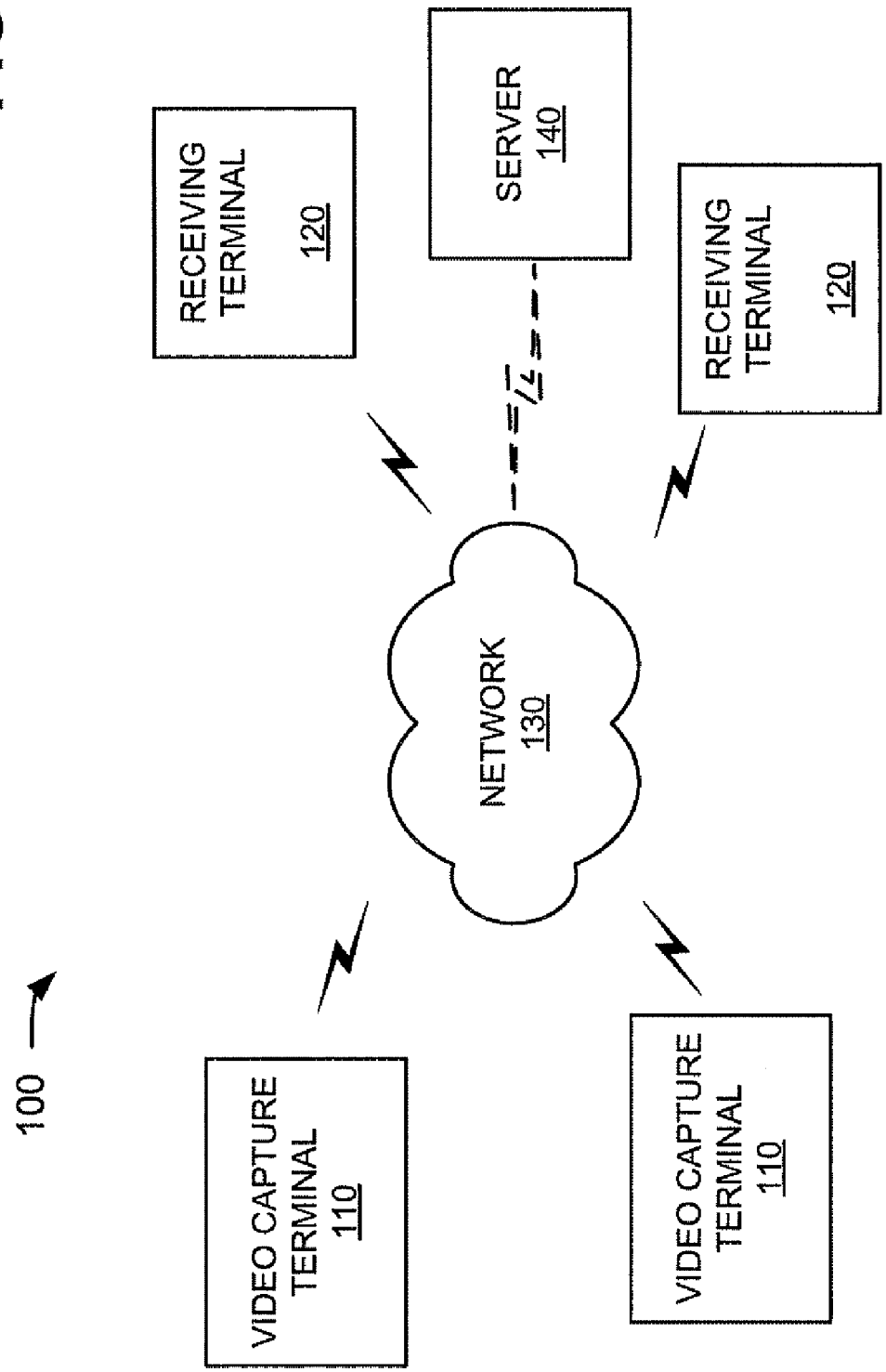
FIG. 1 is a block diagram illustrating an exemplary communications system in which exemplary embodiments described herein may be implemented.

FIG. 1 is a block diagram illustrating an exemplary communications system 100 in which exemplary embodiments described herein may be implemented. Communications system 100 may include a number of video capture terminals 110, a number of receiving terminals 120, and a network 130. Optionally, system 100 may also include a server 140 configured to perform media exchange setup between a video capture terminal 110 and a receiving terminal 120 in the manner set forth in detail below.

Video capture terminal 110 may include any device capable capturing or recording a still or video imagery and transferring the captured imagery, either directly or indirectly, to receiving terminal 120 via network 130. For example, video capture terminal 110 may include a video camera or camcorder, a digital still camera, a cellular telephone having a camera; a Personal Communications System (PCS) terminal that may combine a cellular radiotelephone with data processing, video capture, and data communications capabilities; a personal digital assistant (PDA) that can include a telephone, camera, pager, Internet/Intranet access, Web browser, organizer, calendar and/or a global positioning system (GPS) receiver; a webcam or other video capture-based network device, and a conventional laptop and/or palm-top receiver or other appliance that includes a communications interface and a video capture component. It should also be understood that the invention may also be implemented in other devices that include cameras and communication functionality.

Figure 2:
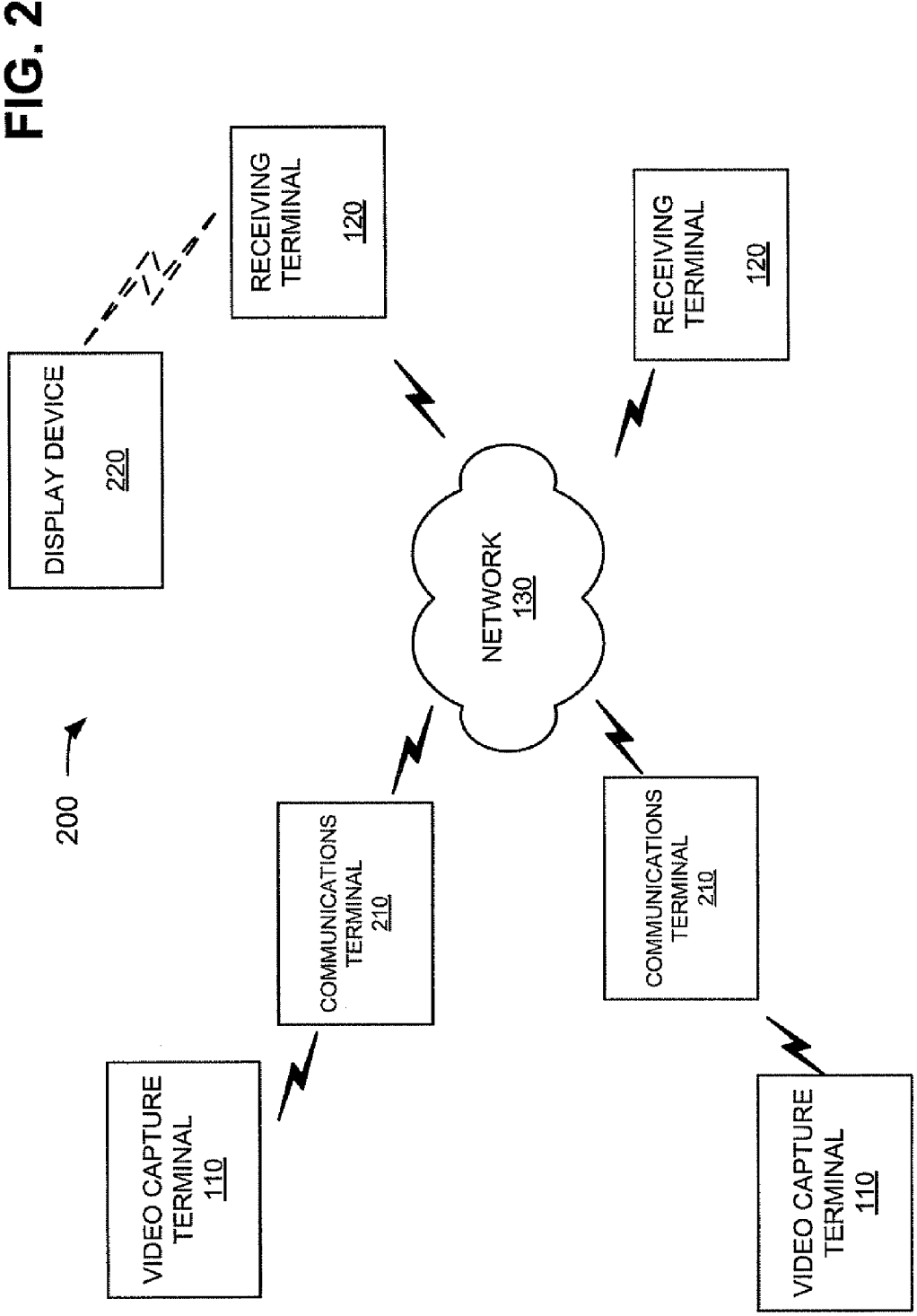
FIG. 2 illustrates another exemplary communications system in which exemplary embodiments described herein may be implemented.

Additionally, video capture terminal 110 may be configured to operate in conjunction with additional devices or components to provide the processing and functionality described herein. FIG. 2 is a block diagram illustrating another exemplary communications system 200 in which exemplary embodiments described herein may be implemented. As illustrated, system 200 may include communications terminals 210 that may be configured to receive captured video from video capture terminal 110s and to transmit the captured video via network 130. For example, video capture terminal 110 may include a video camera having a short-range wireless networking transceiver incorporated therein, such as a Bluetooth or WiFi transceiver. Video capture terminal 110 may relay captured video to a communications terminal 210, such as a mobile telephone incorporating a corresponding Bluetooth or WiFi transceiver. Communications terminal 210 may relay or transmit the capture video to one or more receiving terminals 120 via network 130.

In one exemplary implementation, video capture terminal 110 may include a video camera or video camera component configured to convert captured video into a stream or series of data units, such as packets, available to network 130. "Data unit," as used herein, may refer to any type of machine-readable data having substantially any format that may be adapted for use in one or more networks, such as network 130. A data unit may include packet data and/or non-packet data. Alternatively, video capture terminal 110 may provide the captured video to network 130 in an analog format.

Returning to FIG. 1, receiving terminal 120 may include any addressable device configured to receive captured video from video capture terminal 110, either directly or indirectly via network 130. For example, receiving terminal 120 may include an addressable set-top box or computing device configured to receive captured video from network 130. In additional implementations, receiving terminal 120 may include a wireless telephone terminal that may combine a cellular telephone with data processing and data communications capabilities, a PDA, a television or other display device, a personal media player (PMP), and a conventional laptop and/or palm-top receiver or other appliance that includes a communications interface. As shown in FIG. 2, receiving terminal 120 may be configured to output or display received video on display device 220, such as a monitor or television. Alternatively, receiving terminal 120 may include an integrated display for displaying the received video.

Network 130 may include one or more networks capable of transferring captured video and other data in analog and/or digital formats. Implementations of network 130 may include networks designed primarily for speech data, such as PSTNs. In addition, network 130 may include wireless communications networks such as a cellular-based telephone network based on various underlying wireless protocols, (e.g., GSM (global system for mobile communications), PCS (personal communication services), FDMA (frequency division multiple access), CDMA (code division multiple access), TDMA (time division multiple access), UMTS (universal mobile telecommunications system), EVDO (evolution data only), HSDPA (High Speed Downlink Packet Access), etc.).

In additional implementations, network 130 may use short distance wireless communication protocols such as the Bluetooth protocol, one or more of the IEEE 802.11 protocols, the WiMax protocol, the Ultra Wideband protocol, or any other suitable wireless communication protocol.

In still additional implementations, network 130 may include a data network such as a local area network (LAN), a metropolitan area network (MAN) and/or a wide area network (WAN), such as the Internet, that may operate using substantially any network protocol, such as Internet protocol (IP), asynchronous transfer mode (ATM), and/or synchronous optical network (SONET). Additionally, network 130 may include a cable television (CATV) network.

In additional implementations, network 130 may include a combination of networks. For example, network 130 may include an initial cellular-based network for receiving the captured video from video capture terminal 110 and a second data network, such as the Internet, for receiving the captured video from the cellular-based network and forwarding the captured video to a receiving terminal 120. In such an implementation, network 130 may include a gateway or other routing device or system for relaying the captured video between the initial cellular-based network and the second data network.

Additionally, it should be noted that network 130 may include network devices, such as voice gateways, routers, switches, firewalls, and/or servers (not shown). Network 130 may include a hardwired network using wired conductors and/or optical fibers and/or may include a wireless network using free-space optical and/or radio frequency (RF) transmission paths. Implementations of networks and/or devices described herein are not limited to any particular data format, type, and/or protocol.

As optionally shown in FIG. 1, system 100 may include a server 140 configured to provide setup and initiation of a video transfer between video capture terminal 110 and receiving terminal 120. For example, server 140 may include a session initiation protocol (SIP) server or H.323 gatekeeper configured to maintain addressing and session information for video capture terminals 110 and receiving terminals 120. SIP server 140 may be implemented as a number of different computing devices, with potentially different computing device(s) handling each of the functions of a proxy server, a redirect server, and a registrar.

A proxy server is an intermediary entity that acts as both a server and a client for the purpose of making requests on behalf of other clients. Requests are serviced either internally or by passing them on, possibly after translation, to other servers. A proxy server may interpret, and if necessary, rewrite a request message before forwarding it. A redirect server is a server that accepts a SIP request, maps the SIP address of the called party into zero or more new addresses and returns them to the client. A registrar is a server that accepts SIP "register" requests for the purpose of updating a location database with the contact information of the user specified in the request. In an H.323 implementation, a gatekeeper may perform many of the functions described above with respect to the SIP server.

In one implementation, video capture device 110 and/or receiving device 120 may be connected to or have access to an E.164 Number Mapping (ENUM) database. In one example, the ENUM database may be connected to network 130. The ENUM database may use a domain name service (DNS) to maintain a mapping of E.164 telephone numbers to IP addresses. By using an ENUM database, sessions between video capture terminals 110 and receiving terminals 120 may be made based on conventional numbering schemes, rather than specific IP-based addresses. Once mapped to a corresponding IP-based address, IP-related services associated with the number may be identified and configured.

In implementations including server 140, video transfer requests from video capture terminal 110 to receiving terminal 120 are initially received by server 140. Server 140 may then forward the request to the appropriate receiving terminals. Following session setup, media, such as the captured video and corresponding audio may be transmitted directly between video capture terminal 110 and receiving terminal 120. In one implementation, the video may be transmitted in substantially real time using a protocol such as the real-time transport protocol (RTP)/real-time transport control protocol (RTCP), or the secure real-time transport protocol (SRTP).

Figure 3:
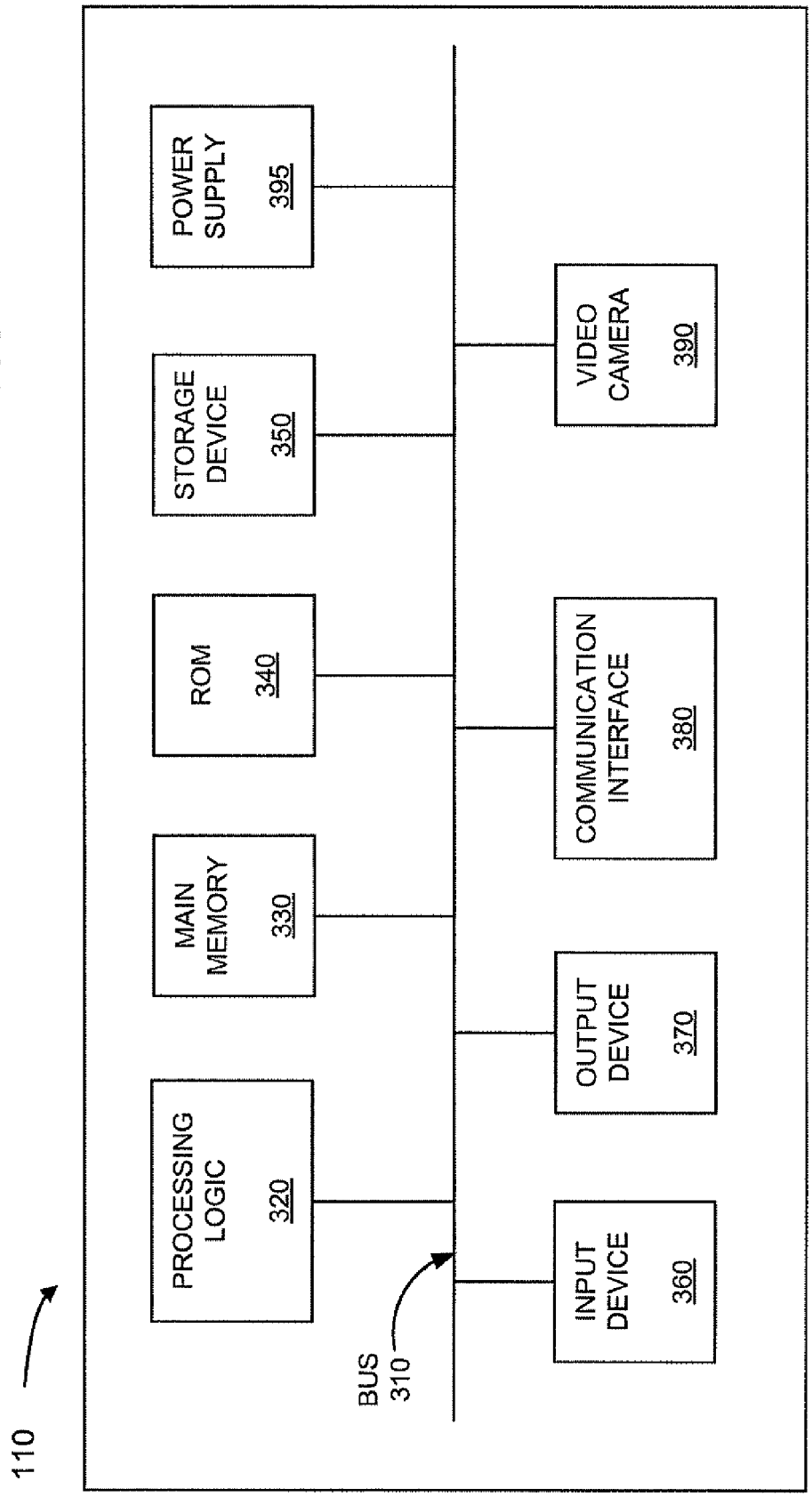
FIG. 3 illustrates an exemplary diagram of the video capture terminal of FIGS. 1 and 2.

FIG. 3 illustrates an exemplary functional diagram of video capture terminal 110. Video capture terminal 110 may include a bus 310, processing logic 320, a main memory 330, a read only memory (ROM) 340, a storage device 350, an input device 360, an output device 370, a communication interface 380, a video camera 390, and a power supply 395. Bus 310 may include one or more paths that permit communication among the elements of video capture terminal 110.

Processing logic 320 may include a processor, microprocessor, an application specific integrated circuit (ASIC), field programmable gate array (FPGA), or the like. Processing logic 320 may include data structures or software programs to control operation of terminal 110 and its components, such as communication interface 380 and video camera 390. Main memory 330 may include a random access memory (RAM) or another type of dynamic storage device that may store information and instructions for execution by processing logic 320. ROM 340 may include a ROM device or another type of static storage device that may store static information and instructions for use by processing logic 320. Storage device 350 may include a solid state (e.g., flash), magnetic, and/or optical recording medium and its corresponding drive. Storage device 360 may be implemented as an external storage medium, such as an external or portable hard drive, flash drive, disk drive, etc, connected to terminal 110 in any suitable manner, such as via USB (universal serial bus), Firewire, SATA (serial advanced technology attachment), etc.

Input device 360 may include a mechanism that permits an operator to input information into video capture terminal 110, such as a keypad, a touch-screen display, voice recognition and/or biometric mechanisms, etc. Output device 370 may include a mechanism that outputs information to the operator, including a display, a speaker, a printer, etc.

Communication interface 380 may include any transceiver-like mechanism that enables video capture terminal 110 to communicate with other devices and/or systems. For example, communication interface 380 may include mechanisms for communicating with another device or system via a network, such as network 130. Communication interface 380 may include, for example, an antenna, a transmitter that may convert baseband signals from processing logic 320 to radio frequency (RF) signals, and/or a receiver that may convert RF signals from the antenna to baseband signals.

Alternatively, communication interface 380 may include a transceiver that performs the functions of both a transmitter and a receiver. Exemplary RF transceivers may include cellular-based transceivers, such as transceivers configured to operate on CDMA, GSM, or TDMA, wireless networks. Additional exemplary RF transceivers may include short or long range wireless communications transceivers, such as transceivers configured to exchange data using Bluetooth, WiFi (i.e., 802.11x), 3G, or 4G networks.

Video camera 390 may include hardware and software based logic to create still or moving images. In one implementation, video camera 390 may include solid-state image capturing components, such as charge coupled devices (CCDs) or CMOS devices. In other implementations, camera 390 may include non-solid state devices, such as devices used to record images onto film. Video camera 390 may include a lens assembly, a shutter, an iris, and/or other devices to record image data received from a subject.

Power supply 395 may include a device to provide power to devices operating within video capture terminal 110. Power supply 395 may include self-contained power sources, such as batteries, or may provide power via an external source, such as a wall outlet or external battery pack.

As will be described in detail below, video capture terminal 110 may perform certain operations. Video capture terminal 110 may perform these operations in response to processing logic 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processing logic 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
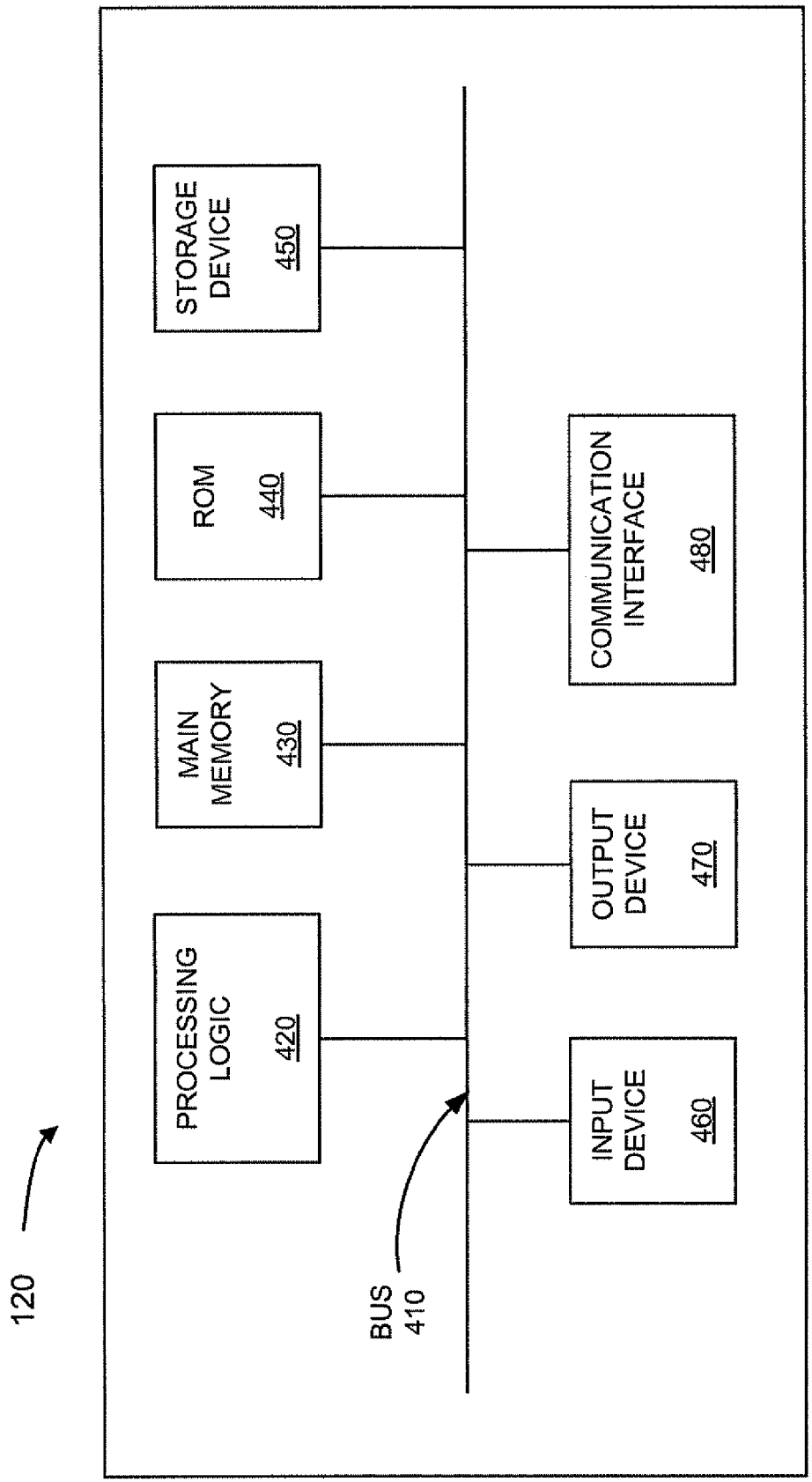
FIG. 4 illustrates an exemplary diagram of the receiving terminal of FIGS. 1 and 2.

FIG. 4 illustrates an exemplary diagram of receiving terminal 120. Receiving terminal 120 may include a bus 410, processing logic 420, a main memory 430, a read only memory (ROM) 440, a storage device 450, an input device 460, an output device 470, and a communication interface 480. Bus 410 may include one or more paths that permit communication among the elements of receiving terminal 120.

Processing logic 420 may include a processor, microprocessor, an application specific integrated circuit (ASIC), field programmable gate array (FPGA), or the like. Processing logic 420 may include data structures or software programs to control operation of receiving terminal 120 and its components, such as communication interface 480 and storage device 450. Main memory 430 may include a random access memory (RAM) or another type of dynamic storage device that may store information and instructions for execution by processing logic 420. ROM 440 may include a ROM device or another type of static storage device that may store static information and instructions for use by processing logic 420. Storage device 450 may include a solid state (e.g., flash), magnetic, and/or optical recording medium and its corresponding drive. Storage device 450 may implemented either internally or externally with respect to receiving terminal 120. External embodiments may include any suitable external storage medium, such as an external or portable hard drive, flash drive, disk drive, etc, connected to receiving terminal 120 in any suitable manner, such as via USB (universal serial bus), Firewire, SATA (serial advanced technology attachment), etc.

Input device 460 may include a mechanism that permits an operator to input information into receiving terminal 120, such as a keypad, a touch-screen display, voice recognition and/or biometric mechanisms, remote-control transceiver, etc. Output device 470 may include a mechanism that outputs information to the operator, including a display, a speaker, a printer, etc. In one implementation, output device 470 may include an output interface for transmitting output information to another device or component, such as a monitor, a television, a display, a computing device, etc.

Communication interface 480 may include any transceiver-like mechanism that enables receiving terminal 120 to communicate with other devices and/or systems. For example, communication interface 480 may include mechanisms for communicating with another device or system via a network, such as network 130. Communication interface 480 may include, for example, an antenna, a transmitter that may convert baseband signals from processing logic 420 to radio frequency (RF) signals, and/or a receiver that may convert RF signals from the antenna to baseband signals. Alternatively, communication interface 480 may include a transceiver that performs the functions of both a transmitter and a receiver. Exemplary RF transceivers may include cellular-based transceivers, such as transceivers configured to operate on CDMA, GSM, or TDMA, wireless networks. Additional exemplary RF transceivers may include short or long range wireless communications transceivers, such as transceivers configured to exchange data using Bluetooth, WiFi (i.e., 802.11x), 3G, or 4G networks. Alternatively, communication interface 480 may include a network adapter or component, such as an Ethernet adapter, a co-axial cable interface, a fiber optic interface, etc. configured to receive data from network 130 via a wired connection.

As will be described in detail below, receiving terminal 120 may perform certain operations. Receiving terminal 120 may perform these operations in response to processing logic 420 executing software instructions contained in a computer-readable medium, such as memory 430. A computer-readable medium may be defined as a physical or logical memory device and/or carrier wave.

The software instructions may be read into memory 430 from another computer-readable medium, such as data storage device 450, or from another device via communication interface 480. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Figure 5:
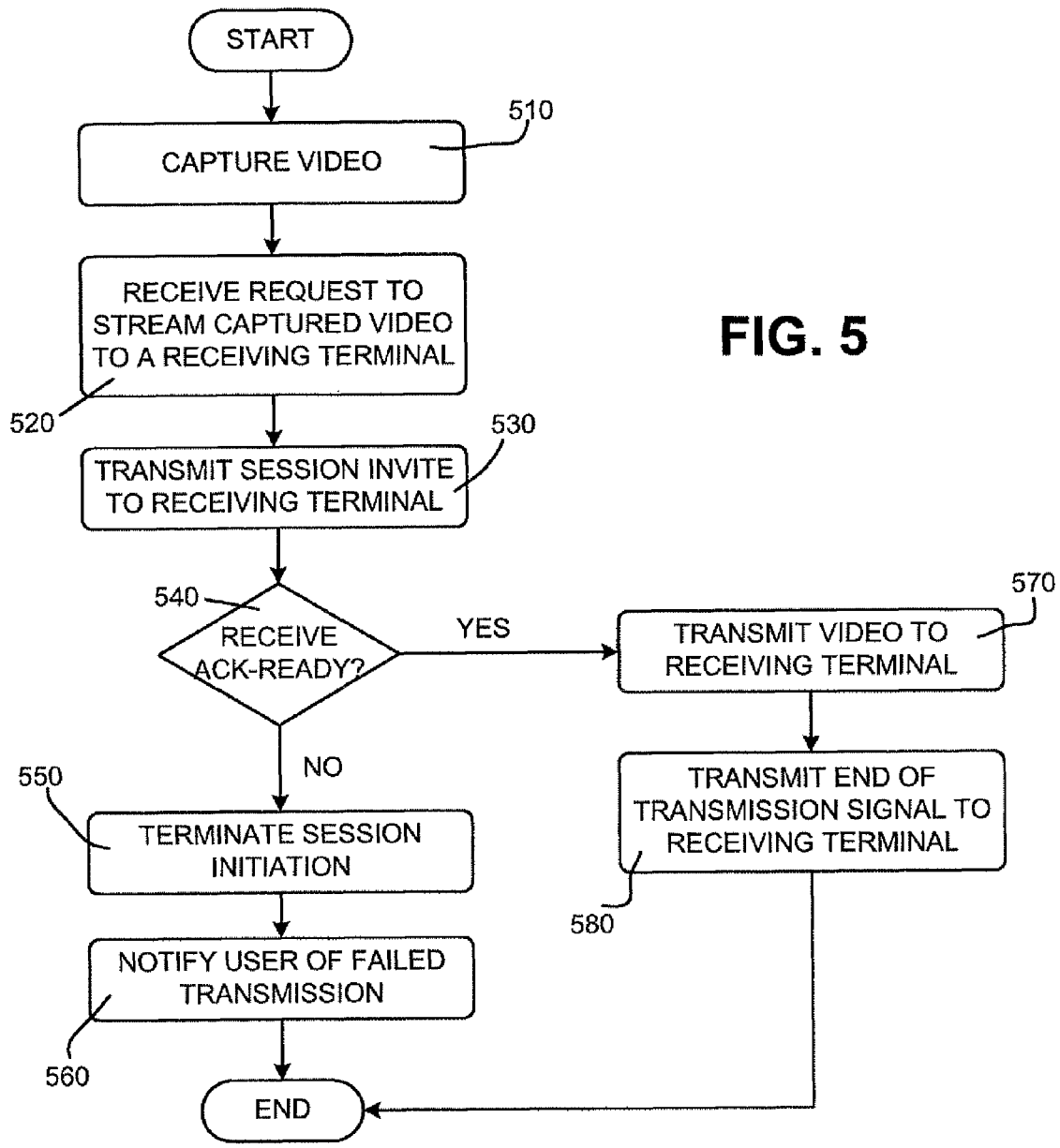
FIG. 5 is a flow chart of an exemplary process for transmitting video from the video capture terminal to the receiving terminal of FIGS. 1 and 2.

FIG. 5 is a flow diagram of an exemplary process for transmitting video from video capture terminal 110 to receiving terminal 120 via network 130. The exemplary process of FIG. 5 may be performed by one or more software and/or hardware components within video capture terminal 110 alone or in combination with communications terminal 210. In another implementation, some or all of the processing may be performed by one or more software and/or hardware components within another device or a group of devices separate from or including video capture terminal 110.

The exemplary process may begin with video capture terminal 110 capturing video (block 510). In one implementation, capturing video may be performed upon receipt of a user request to record a selected scene, such as that viewable through a viewfinder or display included within video capture terminal 110. In an alternative implementation video capture may be initiated remotely from video capture terminal 110.

A request may be received to stream the captured video to one or more receiving terminals 120 via network 130 (block 520). It should be noted that the video stream may be requested substantially simultaneously with the capturing of video, thereby providing an essentially live video stream. Alternatively, the request to stream captured video may involve previously captured or recorded video.

In one implementation, the request may be received via a user interface associated with video capture terminal 110, such as a button or touch-screen/menu-driven display on video capture terminal 110. In one exemplary embodiment, the one or more receiving terminals 120 selected for receiving the video stream may be selected via the user interface. For example, video capture terminal 110 may maintain an address book of addresses associated with receiving terminals 120. Selection of one or more of these addresses may be made via the video capture terminal 110 user interface.

In an alternative implementation, the address book or listing of receiving terminals 120 may be maintained on a device separate from video capture terminal 110, such as communications terminal 210. For example, communications terminal 210 may include a cellular telephone, smart phone, laptop or palmtop computer or other portable computing device, or a PDA having the addresses maintained therein. Each of video capture terminal 110 and communications terminal 210 may include a suitable communications interface for exchanging addressing information between the communications terminal 210 and video capture terminal 110. Exemplary communications interfaces may include a Bluetooth interface, an IrDA (Infrared Data Association) interface, a WiFi interface, a near-field communications (NFC) interface, etc. Such information sharing may reduce the requirement to maintain and update a listing of receiving terminal addresses on multiple user devices.

In an additional exemplary implementation, video capture terminal 110 may receive a grouping of receiving terminals 120 to receive the video stream in an essentially multi-cast manner.

Once the request to stream the captured video to at least one identified receiving terminal 120 has been received, a video session invite message may be transmitted to receiving terminal 120 via network 130 (block 530). Depending on the address and/or network associated with video capture terminal 110 and each receiving terminal 120, one or more networks 130 may be traversed prior to reaching receiving terminal 120. For example, video capture terminal 110 and receiving terminal 120 may each be associated with a cellular communications network. In this embodiment, network 130 may include only the cellular communications network.

In an alternative implementation, video capture terminal 110 may be associated with a cellular communications network, while receiving terminal 120 may be associated with a data network, such as the Internet. In this embodiment, network 130 may include each of the cellular communications network and the Internet with suitable gateway or conversion means used to transmit the invite message to receiving terminal 120.

As described above with respect to FIG. 1, server 140 may be used to setup or configure the video transmission session. In this implementation, the video session invite message may be initially addressed to server 140 and forwarded to receiving terminal 120. In one exemplary implementation, receiving terminals 120 may be provided with proxy addresses associated with server 140.

Following video session invite message transmission, it may be determined whether receiving terminal 120 has accepted or rejected the invitation (block 540). In one exemplary invitation, an accepted invitation may take the form of an acknowledgement-ready (ACK-READY) message, while a rejected invitation may take the form of an acknowledgement-not ready (ACK-NOT READY) message. Receiving terminals may reject video streaming video session invitations for a variety of reasons including a lack of sufficient storage space, a disabled video stream feature on receiving terminal 120, or a powered-down or sleep state of receiving terminal 120. Alternatively, invitation rejection may be assumed following expiration of a suitable time-out period, such as, for example, about 30 seconds.

If the invitation has not been accepted, video streaming session initiation may be terminated (block 550) and a user of video capture terminal 110 may be notified of the failed transmission (block 560). For example, an audible or visual alert may be provided at video capture terminal 110.

If an invitation acceptance has been received, a video and/or audio stream may be transmitted to receiving terminal 120 in substantially real-time via network 130. In one exemplary implementation, the video/audio stream may be transmitted using a protocol such as RTP/RTCP or SRTP. In additional implementations, the video/audio stream may be modified or compressed prior to transmission to receiving terminal 120. Suitable compression methodologies may include 3GP (a container format for storing digital video and audio streams), avi, MPEG-1, MPEG-2, mov (Quicktime video), wmv (Windows Media-Video), etc. Compression and encoding of the video stream prior to transmission to receiving terminal 120 may be performed in substantially real time.

In an implementation involving server 140, once the video streaming session has been established, the video/audio stream may be transmitted directly between video capture terminal 110, without first passing through server 140.

Upon termination or cessation of the video stream, such as, for example ceasing to record with video capture terminal 110 or stopping playback at video capture terminal 110, an end of transmission (EOT) message may be transmitted to receiving terminal 120 (block 580). The EOT message may indicate to receiving terminal 120 that no additional media data may be transmitted, so that receiving terminal 120 may discontinue operating in a media receiving mode.

Figure 6:
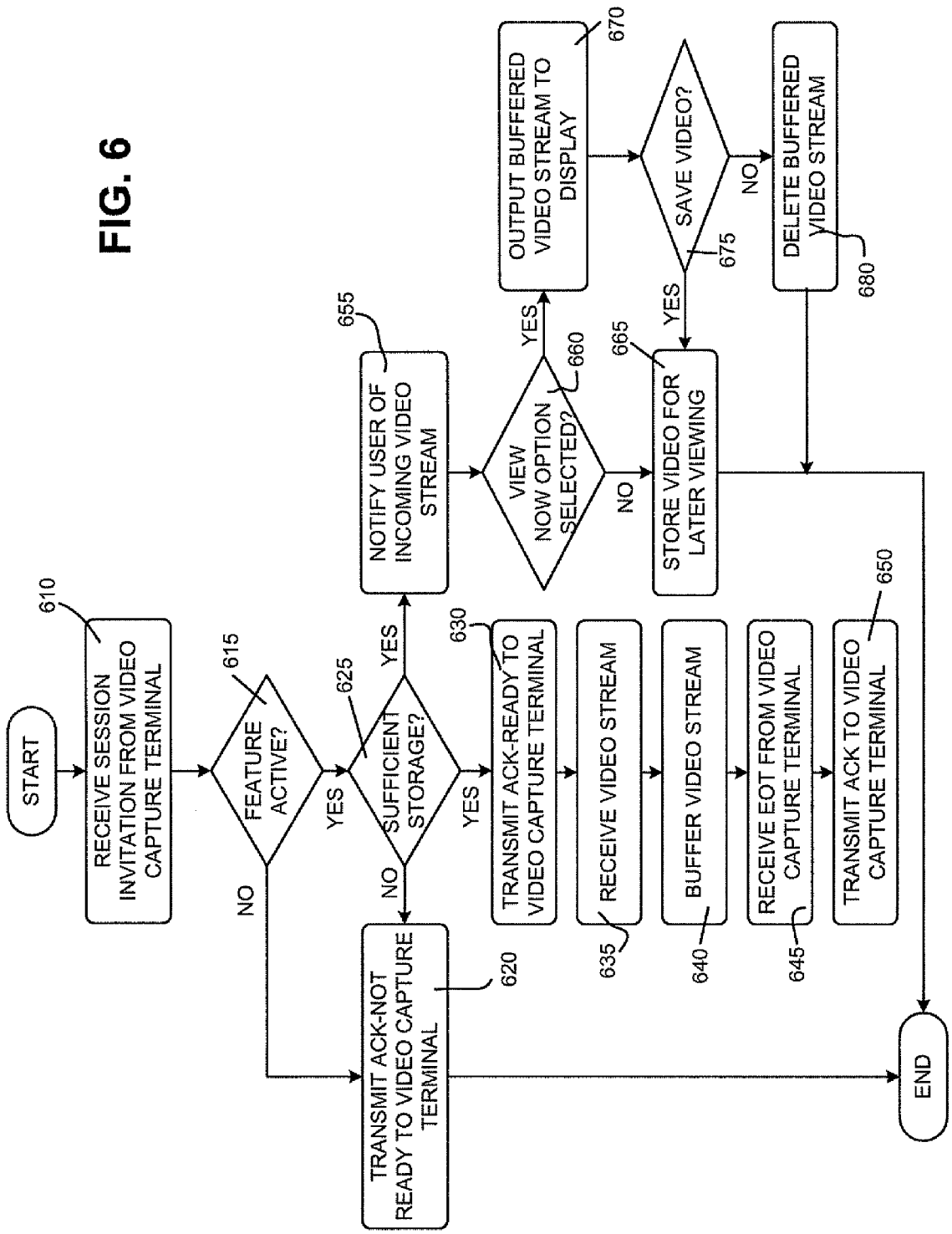
FIG. 6 is a flow chart of an exemplary process for receiving video from the video capture terminal of FIGS. 1 and 2.

FIG. 6 is a flow diagram of an exemplary process for receiving and handling video from video capture terminal 110 via network 130. The exemplary process of FIG. 6 may be performed by one or more software and/or hardware components within receiving terminal 120. In additional implementations, some or all of the processing may be performed by one or more software and/or hardware components within another device or a group of devices separate from or including receiving terminal 120.

The exemplary process may begin with receiving terminal 120 receiving a video session invitation message from video capture terminal 110 via network 130 (block 610). As described above, the video session invitation message may be received either directly or indirectly from video capture terminal 110 via one or more intermediary networks 130. For example, in the case of a SIP or H.323 implementation, the video session invitation message may be received from server 140 to setup the video stream session.

Receiving terminal 120 may determine whether a video streaming capability has been activated or enabled on receiving terminal 120 (block 615). In some scenarios, a user of receiving terminal 120 may disable the video streaming feature, although receiving terminal may be otherwise operational. If the video streaming feature has been disabled, receiving terminal 120 may reject the received invitation by, for example, transmitting an ACK-NOT READY message to video capture terminal 110 via network 130 (block 620).

If the video streaming feature is enabled, receiving terminal 120 may determine whether sufficient storage space (such as storage space within storage device 450 of FIG. 4) is available to receive subsequently transmitted video or audio-video media (block 625). In one exemplary implementation, receiving terminal 120 may assume a predetermined minimum or default size for received video streams. In one implementation, a default storage requirement may be on the order of approximately 100 megabytes (MB). If sufficient storage space is not available, the exemplary process may continue to block 620 for transmission of the invitation rejection message.

If sufficient storage space is available, receiving terminal 120 may accept the received video session invitation by, for example, transmitting an ACK READY message to video capture terminal 110 via network 130 (block 630). Receiving terminal 120 may subsequently receive the video or media stream from video capture terminal 110 (block 635). In an exemplary implementation, the video/audio stream may be received in a manner conforming to a real-time or substantially real-time protocol, such as RTP/RTCP or SRTP.

The received video stream may be buffered at receiving terminal 120 (block 640). In one implementation, the video stream may be buffered in one or more of main memory 430 or storage device 450, depending on the requirements of receiving terminal 120. An EOT message may be received from video capture terminal 110, indicating a termination of the video session (block 645). An acknowledgement message indicating receipt of the EOT message may be transmitted to video capture terminal 110 (block 650).

Substantially in parallel to the receipt of the video stream, receiving terminal 120 may notify a user that an incoming video stream is being received and may offer the user the ability to immediately view the received video stream (block 655). In one exemplary implementation, this notification may include an audible and/or visual notification from receiving terminal 120. For example, receiving terminal 120 may emit an alert or ring tone associated with video streams or particular user's associated with respective video capture terminals 110. Alternatively, receiving terminal 120 may provide a display associated with receiving terminal 120 with a visual indicator relating to the availability of the incoming video stream.

Receiving terminal 120 may determine whether a selection to immediately view the received video stream has been made (block 660). In one implementation, the selection may be made via one or more interface elements associated with receiving terminal 120. For example, a user may press a button on receiving terminal 120 or select a button on a remote control associated with receiving terminal 120. Alternately, a user may select an icon or other graphical element presented in a user interface associated with receiving terminal 120.

If a selection to immediately view the received video stream is not received (either through affirmative user action or based on expiration of a predetermined time-out period), receiving terminal 120 may store the received video stream for later viewing (block 665). In one exemplary implementation, the video stream may be stored in a nonvolatile memory such as storage device 450.

However, upon receipt of the selection to immediately view the received video stream, receiving terminal 120 may output the buffered video stream to a display associated with receiving terminal 120 (block 670). As described above, the display may include an integrated display or may include a separate display device, such as display device 220, operatively connected to receiving terminal 120.

Receiving terminal 120 may determine whether a user wishes to save the received video content for later viewing (block 675). If receiving terminal 120 determines that the user does not wish to store the content for later viewing (e.g., by receiving an affirmative request to delete or remove the video), the received and buffered video may be deleted or otherwise removed from receiving terminal 120 (block 680). otherwise, processing may continue to block 665, described above, where the received video content may be stored for later viewing.

Figure 7:
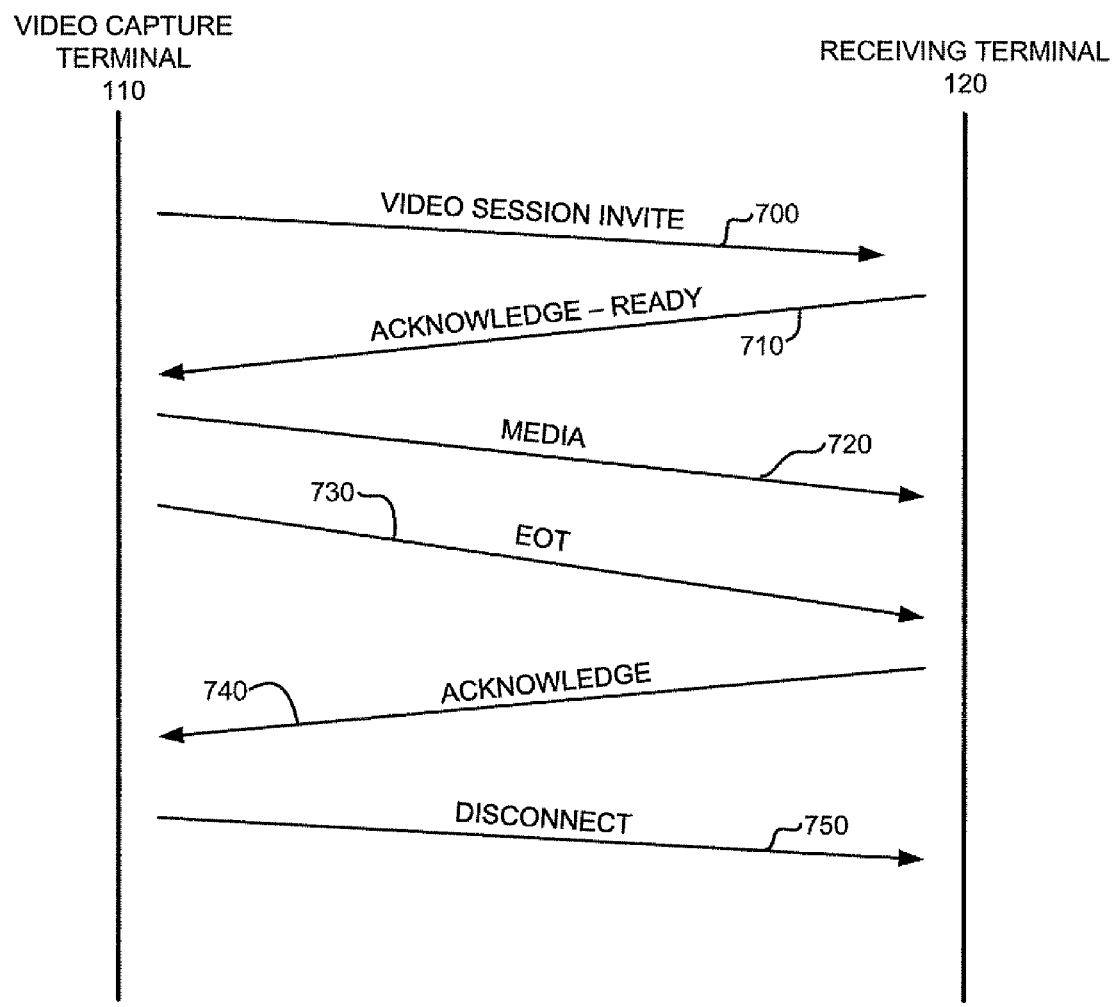
FIG. 7 is a service flow diagram illustrating one exemplary flow of interactions between the video capture terminal and the receiving terminal of FIGS. 1 and 2.

FIG. 7 is a service flow diagram illustrating one exemplary flow of interactions between video capture terminal 110 and receiving terminal 120 when receiving terminal is configured to receive the incoming video stream (e.g., when receiving terminal 120 has the video streaming feature enabled and there is sufficient storage space to receive the streamed video). Initially, a video session invite message is transmitted from video capture terminal 110 to receiving terminal 120 via network 130 (interaction 700). This request may include receiving terminal addressing information as well as information regarding an identification of video capture terminal 110 or a user of video capture terminal 110. As described above, in some implementations, setup or invite messages from video capture terminal 110 may be initially received by an intermediary server 140, such as a SIP proxy server or H.323 gatekeeper. Alternatively, an additional communications terminal 210, such as a mobile telephone or personal computer may be used to deliver the invite message and video media from video capture terminal to network 130.

In response to the received invite message, an acknowledge-ready message may be returned to video capture terminal 110 from receiving terminal 120. The acknowledge-ready message may confirm a ready state of receiving terminal 120, as well as confirm a direct address associated with receiving terminal 120 (interaction 710). Video and/or audio media may then be transmitted from video capture terminal 110 to receiving terminal 120 (interaction 720). Upon cessation of the video stream, an EOT message may be sent from video capture terminal 110 to receiving terminal 120 (interaction 730) indicating that the stream has ended. In response, receiving terminal 120 may send an acknowledgement message to video capture terminal 110 indicating that it has received the EOT message (interaction 740). Video capture terminal 110 may then send a disconnect message to receiving terminal 120 ending the video streaming session (750).

Figure 8:
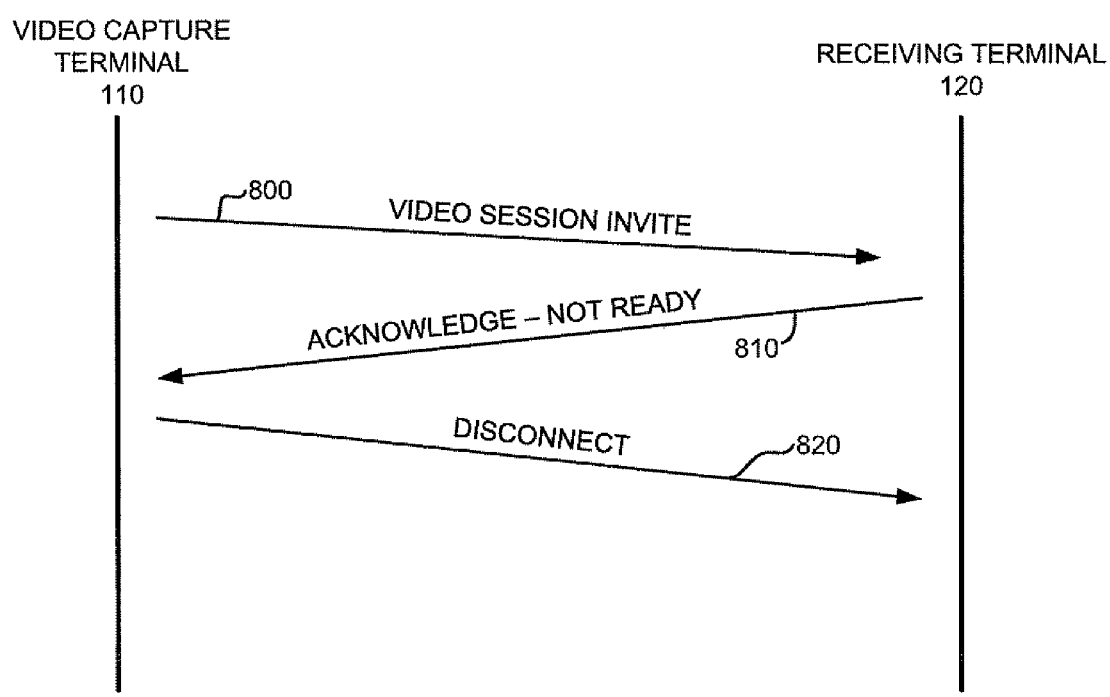
FIG. 8 is a service flow diagram illustrating another exemplary flow of interactions between the video capture terminal and the receiving terminal of FIGS. 1 and 2.

FIG. 8 is a service flow diagram illustrating one exemplary flow of interactions between video capture terminal 110 and receiving terminal 120 when receiving terminal is not configured to receive the incoming video stream, such as when receiving terminal 120 has not enabled the video streaming feature or sufficient storage space to receive the streamed video is not available. Initially, a video session invite message is transmitted from video capture terminal 110 to receiving terminal 120 via network 130 (interaction 800). This request may include receiving terminal addressing information as well as information regarding an identification of video capture terminal 110 or a user of video capture terminal 110. In response to the received invite message, an acknowledge-NOT ready message may be returned to video capture terminal 110 from receiving terminal 120 (interaction 810). Video capture terminal 110 may then send a disconnect message to receiving terminal 120 ending the video streaming session (820).

Implementations described herein may allow for substantially real-time transmission of video data from a video capture device to one or more addressable receiving devices via one or more networks. The video capture device may transmit a session invitation to the receiving device via the one or more networks. Upon acceptance of the invitation, a video stream may be transmitting from the video capture device to the receiving device in substantially real time. The received video stream may be viewed in substantially real time on a display associated with the receiving device. Alternatively, the received video stream may be stored for later viewing.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, implementations consistent with the principles of the invention can be implemented using devices and configurations other than those illustrated in the figures and described in the specification without departing from the spirit of the invention. Devices and/or components may be added and/or removed from the implementations of FIGS. 1-4 depending on specific deployments and/or applications. Further, disclosed implementations may not be limited to any specific combination of hardware, software and/or firmware. In addition, while a series of blocks or interactions have been described with respect to FIGS. 5-8, the order of the blocks or interactions may be varied in other implementations. Moreover, non-dependent acts may be implemented in parallel.

Details of algorithms and/or techniques for compressing and transmitting real-time video streams have not been provided since implementations described herein may use substantially any such algorithms and/or techniques and/or may be customized based on particular requirements associated with an implementation of the invention.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A video device, comprising:
a communications interface configured to communicate with one or more networks;
a short range wireless communications interface configured to communicate with an address book maintaining device separate from the video device, wherein the address book maintaining device includes a corresponding short range wireless communications interface; and
logic configured to:
capture video data,
receive address book entries corresponding to a plurality of receiving terminals from the address book maintaining device via the short range wireless communications interface;
display the received address book entries via a user interface associated with the video device;
receive a user selection of a particular receiving terminal from the plurality of receiving terminals via the user interface;
transmit a video session invitation to the particular receiving terminal via the one or more networks;
receive a video session invitation acceptance message from the particular receiving terminal when the particular receiving terminal determines that at least a predetermined minimum amount of storage is available in a memory of the particular receiving terminal; and
stream the video data to the particular receiving terminal via the communications interface in substantially real-time.

2. The video device of claim 1, wherein the one or more networks comprise at least a cellular-based communications network.

3. The video device of claim 2, wherein the communications interface comprises a transceiver configured to communicate with the cellular-based communications network.

4. The video device of claim 1, further comprising:
a camera for capturing video.

5. The video device of claim 1, wherein the short range wireless communications interface includes one of a Bluetooth, WiFi, infrared, or near-field communications interface.

6. The video device of claim 1, wherein the address book maintaining device comprises one of a personal digital assistant, a mobile telephone, or a portable computing device.

7. The video device of claim 1, wherein the logic is further configured to:
receive an invitation acceptance message from the particular receiving terminal via the one or more networks, and
stream the video data to the particular receiving terminal via the communications interface in substantially real-time following receipt of the invitation acceptance message.

8. The video device of claim 7, wherein the logic is further configured to:
transmit an end of transmission message to the receiving terminal upon cessation of the video stream.

9. The video device of claim 1, wherein the video session invitation is transmitted to an intermediary device via the one or more networks for forwarding to the receiving terminal.

10. The video device of claim 9, wherein the intermediate device comprises one of a session initiation protocol (SIP) proxy server or a H.323 gatekeeper entity.

11. A video receiving device, comprising:
a communications interface configured to communicate with one or more networks;
a memory operatively connected to the communications interface and configured to store video stream data received at the communications interface; and
logic configured to:
receive a video session invitation from a video capture device,
determine whether at least a predetermined minimum amount of storage in the memory is available to receive the video stream;
transmit a video session invitation acceptance message to the video capture device via the one or more networks when it is determined that at least the predetermined minimum amount of storage in the memory is available;

receive a video stream from the video capture device via the one or more networks in substantially real-time,
buffer the video stream in the memory, and
output the buffered video stream to a display.

12. The video receiving device of claim 11, wherein the communications interface comprises one of a data network interface or a cellular-based communications network interface.

13. The video receiving device of claim 11, wherein the logic is further configured to:
transmit a video session invitation rejection message to the video capture device via the one or more networks when it is determined that sufficient storage in the memory is not available.

14. The video receiving device of claim 11, wherein the logic is further configured to:
receive an end of transmission message from the video capture device, and
transmit an end of session acknowledgement message to the video capture device.

15. The video receiving device of claim 11, wherein the logic is further configured to:
determine whether the buffered video stream should be immediately output to the display, and
output the buffered video stream to the display when it is determined that the buffered video stream should be immediately output to the display.

16. The video receiving device of claim 15, wherein the logic configured to determine whether the buffered video stream should be immediately output to the display, further comprises:
logic configured to:
notify a user of the incoming video stream, and
receive a selection to view the incoming video stream from the user.

17. The video receiving device of claim 15, wherein the logic is further configured to:
determine whether the buffered video stream should be saved for later viewing, and
deleting the buffered video stream from the memory when it is determined that the buffered video stream should not be saved for later viewing.

18. The video receiving device of claim 15, wherein the logic is further configured to:
store the buffered video in the memory for later viewing when it is determined that the buffered video stream should not be immediately output to the display.

19. A streaming video system, comprising:
a video capture terminal configured to:
communicate with a first communications network;
receive an identification of a video receiving terminal from an address book maintained on another device;
capture video data;
transmit a video session invitation to the video receiving terminal;
receive a video session invitation acceptance message from the video receiving terminal; and
stream the video data to the video receiving terminal via the first network in substantially real-time;
wherein the video receiving terminal is configured to:
communicate with a second network operatively connected to the first network,
receive the video session invitation from the video capture terminal via the second network;
determine whether at least a predetermined minimum amount of storage is available to receive the video data
transmit the video session invitation acceptance message to the video capture terminal via the second network when it is determined that at least the predetermined minimum amount of storage is available;
receive the streamed video data from the video capture terminal via the second network in substantially real-time; and
output the received video data to a display.

20. The streaming video system of claim 19, wherein the first network is a cellular-based communications network.

21. The streaming video system of claim 19, wherein the receiving terminal is configured to receive the video stream in substantially real-time and store the received video stream in a memory for later viewing.

22. A method for streaming video, comprising:
identifying a video stream receiving device from among a number of video stream receiving devices,
wherein the number of video stream receiving devices is identified from an address book maintained on another device;
transmitting a video session invitation to the identified video stream receiving device via one or more communications networks;
receiving a session invitation acceptance from the identified video stream receiving device when the particular receiving terminal determines that at least a predetermined minimum amount of storage is available in a memory of the identified video stream receiving device;
capturing video data;
forming a substantially real-time video stream based on the captured video data; and
transmitting the video stream to the identified video stream receiving device via the one or more communications networks in substantially real-time.

23. The method of claim 22, wherein the one or more communications networks includes at least a cellular-based wireless communications network.

* * * * *